United States Patent [19]

Hemeyer

[11] 4,291,465
[45] Sep. 29, 1981

[54] CALIPER RULE DEVICE HAVING EXTENDED MEASUREMENT RANGE

[76] Inventor: Arley C. Hemeyer, 8201 W. 78th Pl., Overland Park, Kans. 66204

[21] Appl. No.: 119,459

[22] Filed: Feb. 7, 1980

[51] Int. Cl.³ .............................................. G01B 5/02
[52] U.S. Cl. ............................... 33/143 M; 33/147 T
[58] Field of Search ................. 33/165, 158, 159, 160, 33/143 M, 143 R, 147 J, 147 T

[56] References Cited

U.S. PATENT DOCUMENTS 1,070,816  8/1913  Kunik .................................... 33/165
3,367,032  2/1968  Johnson ............................. 33/147 J

OTHER PUBLICATIONS

American Machinist, "Extensions for Vernier Calipers," 3/1/33, pp. 152 and 153.

Primary Examiner—Harry N. Haroian
Attorney, Agent, or Firm—Lowe, Kokjer, Kircher, Wharton & Bowman

[57] ABSTRACT

A caliper rule device capable of measuring the inside and outside dimensions of objects which vary widely in size. A block and an elongate bar are attached to a scaled rule and to a slide member on the rule. The block has a pair of openings for alternately receiving a pin, depending upon whether an inside or outside dimension is to be measured. The bar has a plurality of spaced openings along its length for mounting a second pin. The openings are located such that when the pins are applied to an object, the measured dimension is equal to the reading on the scale plus a predetermined number which depends upon the position of the second pin on the bar 7 Claims, 2 Drawing Figures

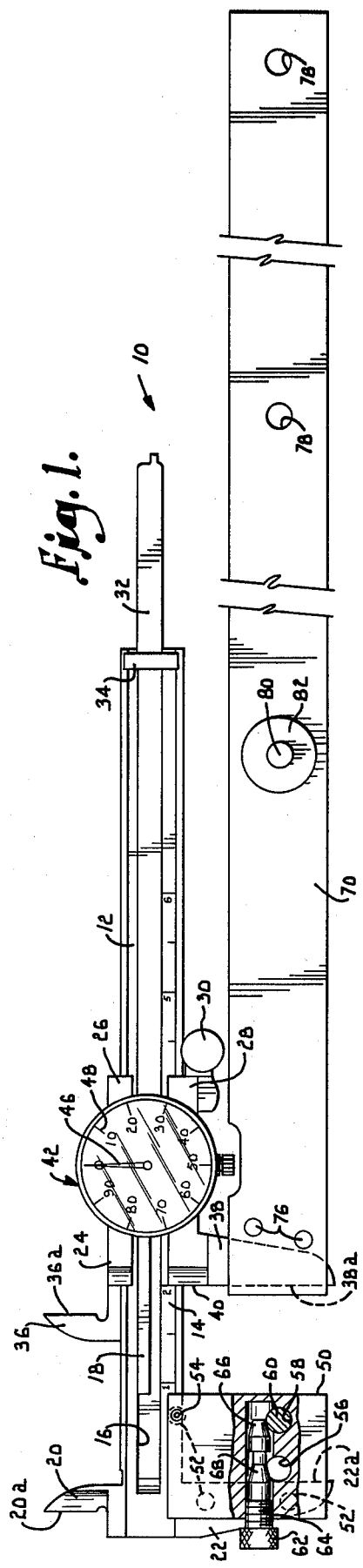

CALIPER RULE DEVICE HAVING EXTENDED MEASUREMENT RANGE

BACKGROUND AND SUMMARY OF THE INVENTION

This invention relates generally to measuring instruments and more particularly to an improved caliper rule device having an extended measurement range.

Although caliper rule measuring instruments have long been in widespread use, they have not been entirely satisfactory in all respects. A typical caliper rule has a relatively small range and is incapable of measuring dimensions which are larger than the range of the instrument. Consequently, a number of different caliper rules having various measurement ranges must be kept on hand if objects having widely varying sizes are to be measured.

The present invention has as its primary object the provision of an improved caliper rule which has an extended measurement range.

Another object of the invention is to provide a caliper rule device which is capable of accurately measuring both the inside and outside dimension of objects which vary widely in size.

A further object of the invention is to provide a caliper rule device of the character described in which the apparatus for extending the measurement range can be readily attached to a conventional caliper rule in order to extend its range.

An additional object of the invention is to provide a caliper rule device of the character described which is simple and economical to construct and which may be in the form of a complete instrument or in the form of an attachment which can be added to an existing caliper rule.

Other and further objects of the invention, together with the features of novelty appurtenant thereto, will appear in the course of the following description.

DETAILED DESCRIPTION OF THE INVENTION

In the accompanying drawing which forms a part of the specification and is to be read in conjunction therewith and in which like reference numerals are used to indicate like parts in the various views:

FIG. 1 is a front elevational view of a caliper rule device constructed according to a preferred embodiment of the present invention, with a portion shown in section for illustrative purposes and the break lines indicating continuous length; and FIG. 2 is a bottom plan view of the caliper rule device shown in FIG. 1 applied to measure the inside diameter of a pipe, with portions shown in section for illustrative purposes and the break lines indicating continuous length.

Referring now to the drawing in detail, reference numeral 10 generally designates a caliper rule device constructed in accordance with a preferred embodiment of the present invention. The device includes a straight rule 12 having a calibrated linear scale 14 on its front face. Scale 14 may be calibrated in any suitable units such as inches or centimeters and fractions thereof. A central groove 16 extends along the length of rule 12. A rack 18 having teeth extending along its lower edge is mounted to rule 12 at a location within the groove 16. Projecting upwardly from the left end of rule 12 is a small jaw or prong 20 having an outwardly facing edge 20a which is used in measuring the inside dimension of an object. A larger jaw or prong 22 projects downwardly from the left end of rule 12 and has an inwardly facing edge 22a which is normally intended to be used in measuring the outside dimension of an object.

A slide member 24 is mounted to rule 12 for sliding movement along the length thereof. Slide 24 has upper and lower flanges 26 and 28 which overlap the front surface of rule 12 in order to assist in maintaining slide 24 in position on the rule member 12. A thumb wheel 30 facilitates movement of slide 24 along rule 12. The slide member 24 has an elongated arm 32 which is received closely in groove 16 and is slidable therein. A small guide 34 is secured to the front surface of rule 12 at the right end thereof. Guide 34 overlaps arm 32 to assist in guiding the slide member and to prevent it from sliding off the end of the rule.

Projecting upwardly from slide 24 is a jaw or prong 36 having an outwardly facing edge 36a which cooperates with edge 20a in measuring the inside dimension of an object. A larger jaw or prong 38 projects downwardly from slide 24 and has an edge 38a which in normal use is intended to be used in cooperation with edge 22a to measure the outside dimension of an object. The lower flange 28 of the slide member 24 has a straight left edge 40 which serves as an indicator to indicate on scale 14 the dimension of the object which is being measured by the instrument.

Slide member 24 also carries a conventional dial type gauge 42 having a small pinion (not shown) which mates with the teeth of rack 18. The pinion is carried on a shaft 44 which is located centrally on dial 42 and which carries a pointer 46 on the dial face. The face of dial 42 is calibrated on its periphery as indicated at 48 to provide an indication of the rotative position of pointer 46. The relationship between rack 18 and the cooperating pinion is such that pointer 46 is rotated one revolution each time slide member 24 is moved one increment (such as 0.1 inch) along rule 12. In this manner, dial 42 cooperates with scale 14 to provide a precise indication of the dimension measured by the device.

As thus far described, the caliper instrument is constructed conventionally. In use of the conventional instrument, surfaces 20a and 36a are applied to the inside surfaces of an object in order to measure the inside dimension thereof. The measured dimension is indicated by reference to scale 14 and dial 42. For example, if edge 40 lines up with the calibration mark on scale 14 which is marked "2" and pointer 46 is located on the "0" calibration mark of gauge 42 as shown in FIG. 1, the inside dimension of the object to which surfaces 20a and 36a are applied is two inches. Measurement of the outside dimension of an object is normally carried out by applying surfaces 22a and 38a to the object and then reading scale 14 and dial 42 in the same fashion. The distance between surfaces 20a and 36a is equal to the distance between surfaces 22a and 38a.

In accordance with the present invention, the conventional caliper rule device is modified in a manner to extend its range of measurement. A block 50 which serves as a mounting bracket is attached to rule 12 by threading a plurality of set screws 52 into the block and tightening them against prong 22. A smaller set screw 54 which serves as an equalization screw is threaded into the block and tightened against rule 12. Screw 54 is tightened against rule 12 on the side opposite the side engaged by screws 52. A pair of equally sized openings 56 and 58 are formed through block 50 at spaced apart locations thereon. The distance between the centers of openings 56 and 58 is equal to twice the diameter of each opening, and their centers are located on a line which extends parallel to the length dimension of rule 12. As will become apparent, opening 56 is used in measuring outside dimensions of objects and opening 58 is used in measuring inside dimensions.

Openings 56 and 58 are sized to closely receive a cylindrical pin 60 which is shown in opening 58 in FIGS. 1 and 2. The pin is held in place by a threaded set screw 62 which is received in an internally threaded bore 64 extending into block 50 at a location to intersect with openings 56 and 58. The inner end of screw 62 has a frustoconical surface 66 which may be engaged against pin 60 in order to hold it in place in opening 58. An intermediate portion of screw 62 has a similarly shaped frustoconical surface 68 which may be engaged against pin 60 in the same manner to secure it in place in opening 56. As shown in FIG. 2, pin 60 projects well beyond the front surface of block 50 when inserted in either opening.

An elongate bar 70 is mounted to slide member 24 for sliding movement therewith relative to rule 12 and block 50. With particular reference to FIG. 2, bar 70 has a recess 72 near one end which receives prong 38. A plate-like bracket 74 is used to clamp bar 70 to prong 38. A pair of screws 76 are fitted through bracket 74 and threaded into openings formed in bar 70 in order to tighten the bracket against prong 38. The bar 70 is mounted with its length dimension oriented parallel to the direction of movement of slide 24 on rule 12.

A plurality of openings 78 are formed through bar 70 and are spaced equidistantly from one another along the length of the bar. In the preferred form of the invention, openings 78 are centered five inches apart although a different spacing may be selected. For a caliper having a six inch rule, the spacing should be less than six inches and is preferably five inches to provide one inch for attachment to the rule. A cylindrical pin 80 may be mounted to project from bar 70 at a location adjacent each of the openings 78. Pin 80 is identical in size to pin 60 and is formed integrally with a nut 82. Projecting in an opposite direction from nut 82 is a hollow sleeve 84 which is internally threaded. Sleeve 84 may be closely inserted through any of the openings 78, and a thumb screw 86 may be threaded into the sleeve from the back of bar 70 in order to mount pin 80 to the bar. Pin 80 projects well forwardly of the front surface of bar 70, and its axis is aligned with the center of the opening 78 which receives sleeve 84.

The caliper rule device 10 may be used to measure either the inside or outside dimension of an object having virtually any size. If the intake dimension of the object to be measured is less than the range of scale 14, prongs 20 and 36 may be used. Surfaces 20a and 36a are applied to the inside surfaces of the object and the measurement is read off of scale 14 and dial 42 in the usual manner.

However, if the inside dimension of the object is greater than the range of scale 14, pins 60 and 80 are used. Pin 60 is secured in the opening 58 which is used for measuring the inside dimensions of objects. Pin 80 is mounted to bar 70 adjacent to the appropriate opening 78. In a preferred form of the invention, the opening 78 which is farthest to the left on bar 70 may be located such that when pin 80 is mounted adjacent to it and pin 60 is mounted in opening 58, the distance between the remote or outwardly facing surfaces of pins 60 and 80 is equal to five inches plus the distance indicated on scale 14 and dial 42. Openings 78 are located five inches apart from one another, as previously indicated. When an object such as a pipe 88 has the outwardly facing surfaces of pins 60 and 80 applied to its inside dimension as shown in FIG. 2, the inside dimension, as measured by the instrument, equals the reading on scale 14 plus five inches when pin 80 is mounted to the first opening 78.

If scale 14 reads two inches exactly, and dial 42 reads "0" the inside diameter of pipe 88 is seven inches. When pin 80 is moved outwardly on bar 70, five inches is added to the measurement each time the pin is moved outwardly to another opening 78. For example, if pin 80 is located adjacent the third opening from the left, the measurement would be fifteen inches plus the reading on scale 14 and dial 42.

To measure the outside dimension of an object, pin 60 is moved to opening 56 which is used for measuring outside dimensions. The proximal or inwardly facing surfaces of pins 60 and 80 are then applied to the outside surfaces of the object which is to be measured. Opening 56 is located such that the distance between the inwardly facing surfaces of pins 60 and 80 is equal to the reading on scale 14 and dial 42 plus five inches if pin 80 is located adjacent the first opening 78. Again, five inches must be added for each movement of pin 80 outwardly to a different opening 78. For example, if the outside dimension of the object is seventeen inches, pin 80 would be mounted to the third opening 78 and the reading on scale 14 would be two inches and dial 42 would read "0". The lower set of prongs 22 and 38 is not used for measurement but instead serves to mount the block and bar which extend the range of the instrument.

It is thus apparent that the caliper rule device 10 is capable of accurately measuring either the inside or outside dimension of an object having virtually any size. The range of the device is limited only by the length of bar 70 which may be as long as desired. The centers of openings 56 and 58 are spaced apart a distance equal to twice the diameter of pins 60 and 80 in measuring the inside and outside dimensions of objects. A five inch spacing between openings 78 is preferred for the sake of convenience. It should be noted that pins 60 and 80 may project to the rear from bar 70 so that dial 42 is readily visible when an object such as a pipe is being measured. In this situation, set screw 54 serves to provide equalization.

The caliper rule device 10 may be provided as an original instrument, or block 50 and bar 70 may be attached in the manner indicated to an existing caliper rule of conventional construction. In either case, the instrument has an extended range which greatly enhances its measuring capabilities.

From the foregoing it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In a caliper rule device having a rule member carrying a first measurement element, a slide member carrying a second measuring element, means coupling said slide member with said rule member for sliding movement to move said measuring elements toward and away from one another, and a scale providing an indication of the distance between the measuring elements, the improvement comprising:
   a first pin element mounted to one of said rule and slide members;
   an elongate bar mounted to the other of said rule and slide members, said bar having a length dimension oriented generally parallel to the direction of movement of the slide member;
   a second pin element;
   means for mounting said second pin element to said bar at a plurality of locations which are spaced along the length of said bar in a manner effecting a predetermined relationship between the indication provided by the scale and the distance between said pin elements at each location of the second pin element, whereby the pin elements may be applied to an object to be measured and reference may be made to the scale for an indication of the dimension of the object corresponding to the distance between said pin elements;
   said pin elements having outwardly facing surfaces facing generally away from one another and inwardly facing surfaces facing generally toward one another, and including means for mounting said first pin element to said one member at a pair of spaced apart positions which are located such that the distance between said outwardly facing surfaces has a predetermined relationship to the indication provided by the scale when said first pin element is in one of said pair of positions, and the distance between said inwardly facing surfaces has a predetermined relationship to the indication provided by the scale when said first pin element is in the other of said positions.

2. In a caliper rule device having a rule member carrying a first measuring element, a slide member carrying a second measuring element, means coupling said slide member with said rule member for sliding movement to move said measuring elements toward and away from one another, and a scale providing an indication of the distance between the measuring elements, the improvement comprising:
   a first pin element mounted to one of said rule and slide members;
   an elongate bar mounted to the other of said rule and slide members, said bar having a length dimension oriented generally parallel to the direction of movement of the slide member;
   a second pin element;
   means for mounting said second pin element to said bar at a plurality of locations which are spaced along the length of said bar in a manner effecting a predetermined relationship between the indication provided by the scale and the distance between said pin elements at each location of the second pin element, whereby the pin elements may be applied to an object to be measured and reference may be made to the scale for an indication of the dimension of the object corresponding to the distance between said pin elements;
   a block mounted to said one member, said first pin element projecting from said block;
   outwardly facing surfaces of said pin elements facing generally away from one another;
   inwardly facing surfaces of said pin elements facing generally toward one another;
   first and second spaced apart openings in said block each adapted to receive said first pin element, the indication provided by the scale having a predetermined relationship to the distance between said outwardly facing surfaces when said first pin element is received in said first opening, and having a predetermined relationship to the distance between said inwardly facing surfaces when said first pin element is received in said second opening.

3. An improvement as set forth in claim 2, including a screw element threaded into said block and having first and second spaced apart surfaces engagable with said first pin element to releasably retain same in the respective first and second openings.

4. In a caliper rule device having a pair of measuring elements for measuring the dimension of an object, a rule member carrying one of the measuring elements, a linear scale on the rule member, a slide member carrying the other measuring element and coupled with the rule member for sliding movement thereon to move the measuring elements toward and away from one another, and an indicator on the slide member cooperating with the scale to indicate thereon the distance between the measuring elements, the improvement comprising:
   first and second pins having inwardly facing surfaces for measuring an outside dimension of an object and outwardly facing surfaces for measuring an inside dimension of an object;
   an elongate bar mounted to the slide member with a length dimension of the bar oriented substantially parallel to the direction of movement of the slide member;
   means for mounting said first pin at a plurality of preselected positions spaced along the length of the bar; and
   a bracket mounted to the rule member and having first and second spaced apart openings each adapted to receive said second pin,
   said openings being so located that the indication provided on the scale by said indicator has a predetermined relationship to the distance between said inwardly facing surfaces when said first pin is in any of said positions and said second pin is in said first opening, and a predetermined relationship to the distance between said outwardly facing surfaces when said first pin is in any of said positions and said second pin is in said second opening.

5. An improvement as set forth in claim 4, including a screw element adapted to be threaded into said bracket and having first and second spaced apart surfaces engagable with said second pin to secure same in the respective first and second openings.

6. An improvement as set forth in claim 4, including a plurality of openings spaced apart from one another along the length of said bar to establish said preselected positions, said mounting means being operable to mount said first pin adjacent each of the openings of said bar.

7. An improvement as set forth in claim 6 wherein said mounting means includes:
   a nut member carrying said first pin in projection therefrom; and
   a screw element adapted to extend through each opening of said bar and threadedly engagable with said nut member to secure same adjacent the opening.

* * * * *